United States Patent [19]

Sindlhauser et al.

[11] Patent Number: 4,885,264

[45] Date of Patent: Dec. 5, 1989

[54] PRESSURE-SINTERED POLYCPYSTALLINE MIXED MATERIALS WITH A BASE OF HEXAGONAL BORON NITRIDE, OXIDES AND CARBIDES

[75] Inventors: Peter Sindlhauser, Probstriedd; Klaus Hunold, Lauben; Alfred Lipp, Bad Worishofen, all of Fed. Rep. of Germany

[73] Assignee: Elektroschmelzwerk Kempten GmbH, Munich, Fed. Rep. of Germany

[21] Appl. No.: 345,201

[22] Filed: Apr. 28, 1989

[30] Foreign Application Priority Data

Jul. 21, 1988 [DE] Fed. Rep. of Germany ....... 3824849

[51] Int. Cl.$^4$ ....................... C04B 35/52; C04B 35/70
[52] U.S. Cl. ........................................ 501/87; 501/92; 501/96; 264/65
[58] Field of Search ................ 501/92, 96, 87; 264/65

[56] References Cited

U.S. PATENT DOCUMENTS

| | | | |
|---|---|---|---|
| 4,097,293 | 6/1978 | Komeya et al. | 501/87 |
| 4,110,084 | 8/1978 | Lee et al. | 264/65 |
| 4,412,008 | 10/1983 | Miyamoto et al. | 501/97 |
| 4,469,802 | 9/1984 | Endo et al. | 264/65 |
| 4,595,545 | 6/1986 | Sane | 264/65 |

OTHER PUBLICATIONS

CA 107:27392u Okuda et al., JP 62, 63, 219 Mar. 19, 1987.
CA 109: 26668z, Koitabashi et al., JP 63, 64973.

*Primary Examiner*—William R. Dixon, Jr.
*Assistant Examiner*—Miriam Sohn
*Attorney, Agent, or Firm*—Burgess, Ryan & Wayne

[57] ABSTRACT

Pressure-sintered polycrystalline mixed materials, with a base of boron nitride, oxides and carbides, are provided in which the hexagonal boron nitride fraction is about 30 to about 85% by weight, the oxide fraction ($ZrO_2$, MgO) is about 10 to about 50% by weight, and the carbide fraction (SiC, TiC, ZrC) is about 5 to about 20% by weight. These mixed materials have a density of at least 94% of the theoretical density and can be produced by hot-pressing powder mixtures composed of hexagonal boron nitride, the selected oxides and carbides at temperatures in the range of from 1500° C. to 1800° C. under a die pressure of 7 to 20 MPa or by isostatically hot-pressing, in a vacuum tight closed case, at temperatures in the range from about 1400° C. to about 1700° C. under a pressure of about 100 to about 300 MPa in a high-pressure autoclave using an inert gas as the pressure transfer medium. These mixed materials are resistant to liquid metals, wear resistant and thermal shock resistant and, owing to these properties, are suitable for use as detachment or break rings in the horizontal continuous casting of steel and non-ferrous metals.

6 Claims, No Drawings

PRESSURE-SINTERED POLYCPYSTALLINE MIXED MATERIALS WITH A BASE OF HEXAGONAL BORON NITRIDE, OXIDES AND CARBIDES

BACKGROUND OF THE INVENTION

1. Field of the Invention

This invention relates, in general, to pressure-sintered polycrystalline mixed materials with a base of hexagonal boron nitride, oxides and carbides. In one aspect, this invention relates to mixed materials having a density of at least 94% of the theoretical density. In a further aspect, the invention is directed to pressure-sintered polycrystalline mixed materials which are particularly useful for detachment or break rings in the horizontal continuous casting of steel and non-ferrous metals.

2. Description of the Related Art

In the horizontal continuous casting of steel, the mold is connected in an airtight manner to a trough. The solidification of the steel, i.e., the formation of the strand shell in the mold, does not, therefore, take place, as in all other continuous casting systems at a phase boundary between liquid steel and the ambient gas, but in a continuous liquid phase.

The junction between trough and mold is formed by a furnace brick which is securely fixed in the furnace and on the mold side by a discharge nozzle which is composed of high-grade refractory material as, for example, zirconium oxide, since it has to absorb high thermal stresses. Adjacent to this discharge nozzle is the detachment or break ring, which is a characteristic component of horizontal continuous casting. This detachment ring has to insure, in continuous operation, that the formation of the strand shell starts from this point on. It, consequently, serves to fix the position of solidification precisely in the mold. Since it is unavoidable that a shell also forms at the detachment ring, the former has to be readily detachable, and must not form an interphase with the material of the detachment ring. In addition, a high thermal shock resistance and high resistance to abrasion are required.

In the systems for the horizontal continuous casting of steel developed since 1960, detachment rings of ceramic material such as silicon nitride, zirconium oxide, boron nitride or aluminum nitride have become known. It also became known, however, that if, for example, silicon nitride rings were used, it was not possible to prevent defects typical of horizontal continuous casting such as transverse cracks at the surface on pulling the solidified ingot out of the mold.

Refractory mixed materials with an oxide base are particularly durable because of the addition of graphite, and have, therefore, proved particularly suitable for immersion nozzles in conventional continuous processes (cf. DE-A-2,936,480, DE-A-3,003,046 and DE-A-3,627,337). These materials cannot, however, be used for break rings in horizontal continuous casting because they interfere with the casting of high-alloy special steels, which are particularly sensitive to the absorption of carbon.

Refractory materials of sintered stabilized zirconium oxide, having a boron nitride content not exceeding 20% (cf. JP 50-21,575, C.A. 100: 196759e, 1984), however, fail to meet the requirements imposed to the same extent as those of zirconium oxide having a boron nitride content of up to 70%, which were produced using mixtures of granulated and powdered boron nitride and are, accordingly, porous (porosity at least 15%) and are, consequently, only of low density (cf. JP 78-45,312, C.A. 89: 94066p, 1978) since chipping and erosion at the break ring are unavoidable. These are associated not only with increased wear of the break rings themselves, but also with undesirable inclusions in the steel which result in a marked reduction in quality and, in particular, with the long casting times required for high-alloy special steels.

Materials of boron nitride alone or with a boron nitride base, in which the hexagonal boron nitride fraction is 80 to 60% by weight and the oxide fraction is composed of zirconium oxide or magnesium oxide, having an adequate density of at least 94% of the theoretical density (based on the boron nitride/oxide mixture), have the advantage over the other known materials that steel and steel alloys virtually do not wet them and in addition, they are easy to work, which is of decisive importance for achieving a break ring shape which is a precise fit at the point of use.

Break rings manufactured from hexagonal boron nitride are, however, too soft and have unduly low mechanical strength with the result that they have a tendency to chipping and erosion, even when low-alloy steels are being cast. Provided that the materials have been sintered to a density of at least 94% of the theoretical density, oxide mixtures, and in particular, $ZrO_2$ or MgO admixtures, do, in fact, achieve improved properties (cf. DE-A-3,510,111) which do not, however, satisfy the requirements imposed in relation to mechanical and chemical resistance and, in particular, for casting high-alloy special steels such as Cr-Ni steels.

Consequently, there is a need for improving the material with a base of boron nitrides or oxides by selecting suitable admixtures in a manner that meets the requirements imposed for use as a detachment or break ring in the horizontal continuous casting, not only of steel, but also of non-ferrous metals.

According to DIN 17 600, non-ferrous metals are understood to mean unalloyed metals, with the exception of iron, and alloys in which any metal, except iron, represent the largest single content.

SUMMARY OF THE INVENTION

This need for improving the material is achieved, according to the invention, by proposing pressure-sintered polycrystalline mixed materials with a base of boron nitride, oxides and carbides in which the hexagonal boron nitride fraction is from about 30 to about 85% by weight, the oxide fraction selected from the group comprising zirconium oxide and magnesium oxide is from about 10 to about 50% by weight, and the carbide fraction selected from the group comprising silicon carbide, titanium carbide and zirconium carbide is from about 5 to about 20% by weight, and which have a density of at least about 94% of the theoretically possible density (based on the boron nitride/oxide/carbide mixture).

DETAILED DESCRIPTION OF THE INVENTION

As starting materials for the production of mixed materials of the invention, use is advantageously made of hexagonal boron nitride powder having an oxygen content of from about 2 to about 8% by weight and a specific surface of from about 5 to about 30 m²/g (measured by the BET method) and of the selected oxide or carbide powder, respectively, with a purity of at least about >97% in each case.

As the oxide powder, one may use commercial unstabilized, partially stabilized and fully stabilized zirconium oxide powders, which may be partially or fully stabilized, with oxide mixtures such as magnesium oxide, cerium oxide or yttrium oxide. Calcium oxide, which is also known as a stabilizing agent, is, however, not preferred if the mixed materials are to be used as break rings in continuous casting in order to avoid undesirable reactions of the steel with the calcium oxide.

Instead of SiC (α- and/or β-SiC) or, in addition to SiC, TiC and/or ZrC powder may be used as the carbide powder.

These powders may be homogeneously mixed in a manner known, per se, in a standard mixing apparatus optionally with a temporary binder being used at the same time and then pressure-sintered until the density of at least about 94% of the theoretical density is achieved. In this process, the mixtures may be hot-pressed in graphite molds, with biaxial pressure application at temperatures of from about 1500° to about 1800° C., and preferably from about 1600° to about 1700° C., with a die pressure of from about 7 to about 20 MPa, and preferably from about 9 to about 11 MPa. Alternatively, the mixtures may also be isostatically hot-pressed in a vacuum tight closed case at a temperature of from about 1400° to about 1700° C., and preferably from about 1500° to about 1600° C. under a pressure of from about 100 to about 300 MPa, and preferably from about 100 to about 200 MPa in a high-pressure autoclave using an inert gas as a pressure transfer medium. Suitable shaped parts with the required dimensions are machined out of the ingots thus obtained.

The pressure-sintered polycrystalline mixed materials are composed of a hexagonal boron nitride phase, a carbide phase and an oxide phase, the boron nitride phase being bound with the boron oxide present in the starting powder (expressed by the $O_2$ content in the specified range). The boron oxide acts as a sintering aid, presumably with partial formation of boron oxynitride phases.

Mixed materials in which the hexagonal boron nitride fraction is from about 50 to about 70% by weight, the carbide fraction is composed of silicon carbide and is from about 5 to about 15% by weight, and the oxide fraction is composed of zirconium oxide which has been partially or fully stabilized with magnesium oxide or yttrium oxide, and which have a density of at least about 95% of the theoretical density, and have proved suitable for the envisaged application as break rings in the horizontal continuous casting, both of steel and, in particular, high-alloy special steels, and also of non-ferrous metals. Mixed materials of this preferred composition are chemically more resistant to liquid metals such as titanium, nickel and chromium than mixed materials of the hitherto known composition without carbide admixture. They exhibit a markedly lower mechanical erosion and an improved wear behavior. They have improved mechanical properties such as bending, stress and modulus of elasticity; they can be worked well mechanically; and are distinguished by a high thermal shock resistance. In addition, they cause a substantially lower bubble formation below the strand surface of the cast strand, and this is of decisive importance for the quality of the castings and, in particular, for use in the field of horizontal continuous casting.

The mixed materials, according to the invention, may be used not only in the field of metal casting, but also in other fields of which the said properties are of importance; for example, as crucible materials in the production of single crystals of metal alloys.

The subject of the invention is explained in more detail in the following Example 1:

EXAMPLE 1

A powder mixture composed of 35% by weight of $ZrO_2$, partially stabilized with 5.0% by weight of $Y_2O_3$, 10% by weight of SiC and 54% by weight of boron nitride ($O_2$ content 4% by weight, specific surface 12 $m^2/g$) and 1% by weight of a temporary binder was hot pressed in a graphite mold to a sintered body at 1700° C. and 11 MPa. The ingot had a diameter of 240 mm. and a height of 220 mm. The density achieved was 95% of the theoretical density.

Detachment rings and specimens for further investigations were machined from this body.

Table 1 shows the measured values compared with pure BN and a hitherto used mixed material (BN+$ZrO_2$).

Table 2 shows the results achieved using this material as a detachment ring in the horizontal continuous casting of steel. An 18% Cr-Ni steel was cast.

The chemical stability of pure BN, BN+$ZrO_2$ and BN+$ZrO_2$+SiC in conjunction with a Cr-Ni steel melt was measured in a special experiment. In this experiment, the $N_2$ and boron content in the solidified steel specimen was measured after contact with the materials. The values given in Table 2 have been determined after a contact time of 6 minutes.

TABLE 1

| Measurement Parameter | Unit | | Boron Nitride Perpendicular to Pressing Direction | Boron Nitride Mixture BN + $ZrO_2$ | Mixture BN + $ZrO_2$ + SiC |
|---|---|---|---|---|---|
| Modulus of Elasticity | $N/mm^2$ | | 45,000 | 54,000 | 75,000 |
| Bending Rupture Strength | $N/mm^2$ | | 45 | 77 | 155 |
| Hardness | HK 0,1 | | 250 | 410 | 325 |
| Thermal Expansion | $K^{-1}$ | | $4.0 \times 10^{-6}$ | $5.0 \times 10^{-6}$ | $3.5 \times 10^{-6}$ |
| Thermal Conductivity | W/mk | at 20° C. | 41.5 | 50.0 | 35.0 |
| | | at 1000° C. | 20.6 | 18.0 | 14.0 |

TABLE 2

| | Boron Nitride | Boron Nitride + 30% $ZrO_2$ | Boron Nitride + $ZrO_2$ + SiC |
|---|---|---|---|
| Steel Quality | 18% Cr—Ni Steel | 18% Cr—Ni Steel | 18% Cr—Ni Steel |
| Casting Time | 60 Minutes | 60 Minutes | 120 Minutes |
| Quantity Cast | 25 t | 25 t | 50 t |
| Wear | Annular erosion, in- | Marked erosion, little chip- | Only a little erosion and |

TABLE 2-continued

| | Boron Nitride | Boron Nitride + 30% ZrO$_2$ | Boron Nitride + ZrO$_2$ + SiC |
|---|---|---|---|
| | creased chipping, ring cannot be used again | ping, ring can only be used again to a limited extent | chipping, ring can be used again |
| N$_2$ Content in Steel Specimen, Content by Mass in % | 0.33 | 0.08 | 0.05 |
| B Content in Steel Specimen, Content by Mass in % | 0.17 | 0.05 | 0.02 |
| Intensity of Bubble Formation Based on Boron Nitride as 100% | 100 | 25–35 | 5–10 |

What is claimed is:

1. A pressure-sintered polycrystalline mixed material with a base of powders of boron nitride, an oxide and a carbide, in which the boron nitride fraction is hexagonal and is present in an amount of from about 30 to about 85% by weight, the oxide is selected from the group consisting of zirconium oxide and magnesium oxide and is from about 10 to about 50% by weight, and the carbide is selected from the group consisting of silicon carbide, titanium carbide and zirconium carbide and is from about 5 to about 20% by weight, and which have a density of at least about 94% of the theoretically possible density, the weight being based on the total weight of said mixed material.

2. The pressure-sintered polycrystalline mixed material of claim 1, wherein said oxide is zirconium oxide and said carbide is silicon carbide.

3. The pressure-sintered polycrystalline mixed material of claim 2, wherein the zirconium oxide is partially stabilized with yttrium.

4. The pressure-sintered polycrystalline mixed material of claim 1, which is in the form of a break ring for use in the horizontal continuous casting of steel and non-ferrous metals.

5. A process for producing the pressure-sintered polycrystalline mixed materials of claim 1, which comprises hot-pressing a powder mixture composed of powders of an oxide, a carbide and hexagonal boron nitride having an oxygen content of from about 2 to about 8% by weight and a specific surface of 5 to 30 m$^2$/g, as measured by the BET method, and said oxide and carbide powders each having a purity of >97%, at a temperature in the range of from about 1500° to about 1800° C. under a die pressure of from about 7 to about 20 MPa.

6. A process for producing the pressure-sintered polycrystalline mixed materials of claim 1, which comprises isostatically hot-pressing a powder mixture composed of powders of an oxide and boron nitride having an oxygen content of from about 2 to about 8% by weight and a specific surface of 5 to 30 m$^2$/g, as measured by the BET method, and said oxide and carbide powders each having a purity of >97% in a vacuum tight closed capsule at a temperature in the range of from about 1400° to about 1700° C. under a pressure of from about 100 to about 300 MPa, in a high pressure autoclave using an inert gas as the pressure transfer medium.

* * * * *